US011733392B2

(12) United States Patent
Metzger et al.

(10) Patent No.: US 11,733,392 B2
(45) Date of Patent: Aug. 22, 2023

(54) METHOD FOR ASCERTAINING AT LEAST ONE PIECE OF INTEGRITY INFORMATION RELATING TO A LOCATION RESULT OF A GNSS-BASED LOCATION DEVICE OF A VEHICLE IN THE EVENT OF AN ABRUPTLY AND SIGNIFICANTLY CHANGING GNSS RECEPTION SITUATION

(71) Applicant: Robert Bosch GmbH, Stuttgart (DE)

(72) Inventors: Alexander Metzger, Rottenacker (DE); Lena Schindler, Gerlingen (DE); Marco Limberger, Ludwigsburg (DE); Mohammad Tourian, Stuttgart (DE); Thomas Friederichs, Aspach-Hohrot (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 17/504,593

(22) Filed: Oct. 19, 2021

(65) Prior Publication Data

US 2022/0128705 A1  Apr. 28, 2022

(30) Foreign Application Priority Data

Oct. 22, 2020 (DE) ...................... 10 2020 213 320.4

(51) Int. Cl.
*G01S 19/25* (2010.01)
*G01S 19/31* (2010.01)

(52) U.S. Cl.
CPC ............ *G01S 19/252* (2013.01); *G01S 19/31* (2013.01)

(58) Field of Classification Search
CPC .......... G01S 19/252; G01S 19/31; G01S 19/20
See application file for complete search history.

(56) References Cited

U.S. PATENT DOCUMENTS

| 2014/0232595 | A1  | 8/2014  | Rife |
| 2021/0165104 | A1* | 6/2021  | Zalewski ................ G01S 19/36 |
| 2021/0255336 | A1* | 8/2021  | Noble ................... G01S 19/074 |
| 2021/0382181 | A1* | 12/2021 | Grgich .................... G01S 19/20 |
| 2021/0389473 | A1* | 12/2021 | Rokosz ................... G01S 19/45 |
| 2022/0065980 | A1* | 3/2022  | Ahlbrecht ............ G01C 25/005 |

* cited by examiner

*Primary Examiner* — Timothy A Brainard
*Assistant Examiner* — Kenneth W Good
(74) *Attorney, Agent, or Firm* — Maginot, Moore & Beck, LLP

(57) ABSTRACT

The disclosure concerns a method for ascertaining at least one piece of integrity information relating to a location result of a GNSS-based location device of a vehicle in the event of an abruptly and significantly changing GNSS reception situation, comprising at least the following steps: (a) ascertaining the current ego position of the vehicle by means of the GNSS-based location device; (b) ascertaining at least one piece of integrity information relating to the ego position ascertained in step (a), by means of the GNSS-based location device; (c) detecting an abruptly and significantly changing or significantly altered GNSS reception situation; and (d) adapting the ascertainment of the at least one piece of integrity information for the changing or altered GNSS reception situation.

11 Claims, 1 Drawing Sheet

METHOD FOR ASCERTAINING AT LEAST ONE PIECE OF INTEGRITY INFORMATION RELATING TO A LOCATION RESULT OF A GNSS-BASED LOCATION DEVICE OF A VEHICLE IN THE EVENT OF AN ABRUPTLY AND SIGNIFICANTLY CHANGING GNSS RECEPTION SITUATION

This application claims priority under 35 U.S.C. § 119 to patent application no. DE 10 2020 213 320.4, filed on Oct. 22, 2020 in Germany, the disclosure of which is incorporated herein by reference in its entirety.

The disclosure concerns a method for ascertaining at least one piece of integrity information relating to a location result of a GNSS-based location device of a vehicle in the event of an abruptly and significantly changing GNSS reception situation. Additionally, a computer program for carrying out the method, a machine-readable storage medium and a correspondingly designed location device for a vehicle are specified. The disclosure can in particular be used for GNSS-based location systems for autonomous or semiautonomous driving.

BACKGROUND

The Global Navigation Satellite System (GNSS) can be used to perform geospatial position determination at essentially any point on Earth. A GNSS satellite circles the earth and transmits coded signals that the GNSS receiver uses to calculate the range, or the distance, from the receiver to the satellite by estimating the time difference between the time of signal reception and the transmission time. The estimated ranges to satellites can be converted into an estimate of the position of the receiver if enough satellites are tracked (typically more than 5). At present, there are more than 130 GNSS satellites circling the earth, which means that normally no more than 65 of them are visible on the local horizon.

When referring to the performance of the (GNSS/INS) location sensor, the integrity criterion is usually mentioned in addition to the three criteria of accuracy, continuity and availability. Integrity is generally defined as the measure of confidence that can be placed in the correctness of the information delivered by a GNSS or GNSS/INS system. Integrity ascertainment approaches examined hitherto are essentially based on the current variance and/or standard deviation relating to the parameter estimation of the location solution. However, this primarily mathematical approach can have the disadvantage that changes in external influences cannot be adequately taken into consideration, which means that there is at least from time to time the possibility of integrity values being ascertained that do not adequately live up to the real situation, in the worst case show an excessively high level of integrity. In this regard, the focus here is in particular on further improving location solutions that allow integrity ascertainment to be performed.

SUMMARY

The proposal here is a method for ascertaining at least one piece of integrity information relating to a location result of a (at least also) GNSS-based location device of a vehicle in the event of an abruptly and significantly changing GNSS reception situation, comprising at least the following steps:
a) ascertaining the current ego position of the vehicle by means of the GNSS-based location device,
b) ascertaining at least one piece of integrity information relating to the ego position ascertained in step a), by means of the GNSS-based location device,
c) detecting an abruptly and significantly changing or significantly altered GNSS reception situation,
d) adapting the ascertainment of the at least one piece of integrity information for the changing or altered GNSS reception situation.

Steps a), b), c) and d) can be carried out at least once and/or repeatedly in the indicated order, for example, for the purpose of carrying out the method. In addition, steps a), b), c) and d), in particular steps a) and b) and if applicable c), can at least sometimes be carried out in parallel or at the same time.

The method can in particular contribute to ascertaining at least one piece of integrity information, such as for example a so-called protection level, during a phase in which (purely or predominantly) GNSS-based location is not possible, in particular during dead reckoning (DR, for short). Dead reckoning in particular concerns a phase or mode of operation in which the location device resorts to an inertial location method, such as for example inertial navigation. This can be carried out for example if GNSS reception is disrupted or severely limited, as can be observed for example in urban canyons or street canyons, beside trucks and/or in tunnels.

The location device (location sensor) can be a combined GNSS-INS sensor, for example, or location can comprise such. In this regard, INS stands for inertial navigation system. The location device can therefore be designed to carry out location of the vehicle at least also on the basis of GNSS measurements. The location device can preferably also be designed to carry out location of the vehicle on the basis of GNSS measurements and inertial measurements and/or vehicle sensor data, such as for example environment sensor data, in a combined or fused manner. The vehicle sensors used can be steering angle sensors and/or wheel speed sensors, for example. The environment sensors used can be cameras, RADAR sensors, LIDAR sensors and/or ultrasonic sensors, for example. Additionally, map data from a digital map and/or messages from other vehicles can be used for location.

Step a) involves ascertaining the current ego position of the vehicle by means of the GNSS-based location device. The location device can carry out combined (hybrid) GNSS- and INS-based location. Should GNSS-based location not be possible from time to time, it is possible to resort to INS-based location in step a). The location device can carry out at least one parameter estimation for the purpose of location. The parameters estimated can be for example the (ego) position, (ego) velocity, (ego) acceleration and/or alignment of the vehicle. In particular, at least the (ego) position of the vehicle is estimated.

Step b) involves ascertaining at least one piece of integrity information relating to the ego position ascertained in step a), by means of the GNSS-based location device. The integrity information can in particular be an integrity range of a parameter estimation (of the at least one parameter described previously), the integrity range describing the range containing an estimated parameter with a minimum probability. In other words, the integrity range describes the range actually containing an estimated parameter value with a minimum probability. The estimated parameter (value) basically describes a (single, in particular current) estimation result of the parameter estimation. In other words, this means in particular that the integrity range describes the range containing a real or actual value of an estimated parameter with a minimum probability. Such an integrity range can also be referred to as a so-called protection level.

The minimum probability is generally a predefined minimum probability. The minimum probability is preferably 90%, particularly preferably 95% or even 99%.

The integrity range is preferably a protection level. The protection level generally describes the (spatial, in particular two- or three-dimensional) range (actually) containing an estimated parameter (value) with a minimum probability. The estimated parameter (value) basically describes a (single, in particular current) estimation result of the parameter estimation. In other words, this means in particular that the protection level describes the range containing a real or actual value of an estimated parameter with a minimum probability.

Expressed in other words still, a protection level in particular describes a confidence interval or a (spatial) confidence range containing the true value of an estimated parameter with a minimum probability. The estimated value of the parameter is usually situated in the middle or center of the confidence interval or confidence range.

The minimum probability with which a real or actual value of an estimated parameter is actually within a protection level is very much greater than in the case of "usual" integrity ranges. The minimum probability here is usually above 99.99%, particularly preferably above 99.999% or even above 99.9999%. The minimum probability for the protection level can also be expressed not as a percentage but rather as possible errors in a determined time interval. By way of example, a protection level can be defined in such a way that the parameter in question is outside the protection level no more than once in 10 years. The protection level can be expressed for example either as a unitless probability or as a rate, i.e. as a probability of error occurrence over a time interval.

The protection level is a (safety) parameter of the integrity concept used in urban vehicle contexts. The protection level can also be described as a statistical error limit that is calculated such that the probability of the absolute positional error exceeding an alarm limit is less than or equal to the target integrity risk. In a similar manner to the definition of alarm limits, the protection level can also usually be defined separately for the horizontal plane (horizontal protection level, HPL) and the vertical direction (vertical protection level, VPL). The focus here is in particular on the horizontal dimension, which is defined as the horizontal protection level with the radius of a circle or (more generally) with the half-axes of an ellipse in the horizontal plane (the local plane, which is tangent to the ellipsoid WGS-84), its center being situated at the true position describing the range for which compliance with the specified horizontal position is ensured. This is in particular a horizontal region in which the requirements for the detection of malfunctions and false alarms for the chosen satellite set are met if autonomous error detection is used. In general, the alarm limit is specified by the applications and the protection level is calculated by the location device. Since the positional error is not observable, a decision about alerting can be made by comparing a specified alarm limit (AL) and the calculated protection level (PL); in particular if PL>AL then an alarm can be triggered. By contrast, if PL<AL then an alarm is not usually to be triggered.

Step c) involves detecting an abruptly and significantly changing or significantly altered GNSS reception situation. The GNSS reception situation is in particular characterized by the number and/or constellation of GNSS satellites that are receivable (without interference and/or without reflection). This usually concerns those GNSS satellites that can be received by the vehicle or a GNSS antenna of the vehicle. Here, "abruptly" is in particular understood, in other words, to mean a sudden change, for example a change that takes place over a period of 60 seconds or less, preferably over a period of 30 seconds or less, particularly preferably over a period of 15 seconds or less. Here, "significantly" is in particular understood, in other words, to mean a severe change, for example a change in the GNSS reception situation by at least 50%, preferably by at least 70% and particularly preferably by at least 90%. A significant reduction in the GNSS reception situation can be observed upon entering a tunnel, for example. In this case, the number of receivable GNSS satellites generally reduces abruptly by at least 90% or even completely. A significant rise in the GNSS reception situation can be observed upon exiting a tunnel, for example. In this case, the number of receivable GNSS satellites generally increases abruptly. A significantly altered GNSS reception situation can be observed while travelling in a tunnel, for example. The tunnel is chosen in this case as an example of areas with significant GNSS shadowing. The benchmark used is in particular usual GNSS reception in the open.

Step d) involves adapting the ascertainment of the at least one piece of integrity information for the changing or altered GNSS reception situation. Adaptation is achieved in particular by artificially intervening in an otherwise mathematically stipulated calculation of the integrity information. In a normal GNSS reception situation (without interference), the integrity information can be ascertained for example on the basis of at least one variance and/or standard deviation relating to an estimation of the ego position. A location filter, such as for example a Kalman filter, can be used for this, for example. Such a filter generally stores an algorithm that can process GNSS data and/or INS data as input quantities in order to output a position result and related integrity information, such as for example a variance (or standard deviation) and/or covariance matrix, as output quantities during an estimation. The adapting in this regard can be effected for example by multiplying the integrity information (variance and/or standard deviation) by a scaling factor and/or adding a supplement to the integrity information. A deduction is generally not required, since it was typically possible to observe excessively low values for the integrity information, in particular the protection level, in the case of the changes in the reception situation that are being focused on here. In other words, this means in particular that the scaling factor and/or the supplement (value) are generally always positive.

According to one advantageous configuration, it is proposed that the adapting in step d) is effected such that changes to the integrity information that occur as a result of the abruptly and significantly changing or significantly altered GNSS reception situation are damped and/or at least in some cases corrected. "Damped" is in particular intended to be understood to mean that excessive downward swings are artificially counteracted.

According to another advantageous configuration, it is proposed that the adapting in step d) is effected such that during abruptly and significantly diminishing GNSS reception the integrity information is scaled using a (positive) scaling factor and/or has an ascertained first (positive) supplement value applied to it. In this regard, the scaling using the and/or the applying of the ascertained first supplement value can be carried out for a predefinable first length of time (or during a first predefinable length of time). The first length of time can be chosen for example in accordance with the usual transition time upon entering a tunnel.

According to another advantageous configuration, it is proposed that the adapting in step d) is effected such that during significantly diminished GNSS reception the integrity information has an ascertained second (positive) supplement value applied to it. There is generally no provision for a second length of time, but it would be conceivable to apply the second supplement value for a second length of time.

According to another advantageous configuration, it is proposed that the adapting in step d) is effected such that during abruptly and significantly intensifying GNSS reception the integrity information has an ascertained third (positive) supplement value applied to it. In this regard, the applying of the ascertained third supplement value can be carried out for a predefinable third length of time (or during a predefinable third length of time). The third length of time can be chosen in accordance with the usual transition time upon exiting a tunnel, for example.

According to another aspect, a computer program for carrying out a method that is presented here is proposed. In other words, this concerns in particular a computer program (product), comprising commands that, when the program is executed by a computer, prompt said computer to perform a method that is described here.

According to another aspect, a machine-readable storage medium on which the computer program proposed here is deposited or stored is proposed. The machine-readable storage medium is normally a computer-readable data medium.

According to another aspect, a location device for a vehicle is proposed, the location device being designed to carry out a method that is described here. The apparatus can for example comprise a computer and/or a control unit (controller) that can execute commands in order to perform the method. To this end, the computer or the control unit can execute the specified computer program, for example. The computer or the control unit can for example access the specified storage medium in order to be able to execute the computer program. The location device can be for example a motion and position sensor that is in particular arranged in or on the vehicle.

The details, features and advantageous configurations discussed in connection with the method can accordingly also arise for the computer program and/or storage medium and/or location device presented here, and vice versa. In this respect, reference is made to the entire content of the embodiments there for the purpose of characterizing the features in more detail.

BRIEF DESCRIPTION OF THE DRAWINGS

The solution presented here and the technical context for said solution are explained in more detail below with reference to the figures. It should be pointed out that the disclosure invention is not intended to be restricted by the exemplary embodiments shown. In particular, unless explicitly shown otherwise, it is also possible to extract partial aspects of the substantive matter explained in the figures and to combine said partial aspects with other parts and/or insights from other figures and/or the present description. In the figures.

DETAIL DESCRIPTION

Figure 1:
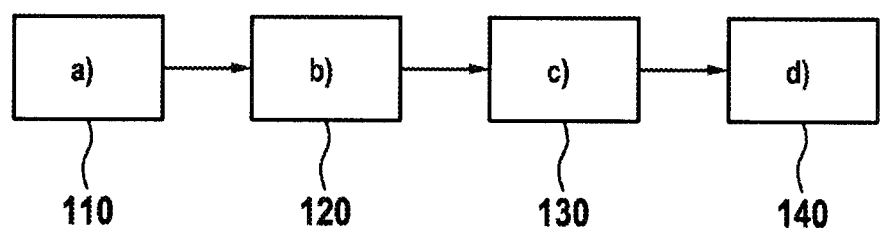
FIG. 1: schematically shows an illustrative cycle for the method presented here.

FIG. 1 schematically shows an illustrative cycle for the method presented here. The method is used to ascertain at least one piece of integrity information relating to a location result of a GNSS-based location device 2 of a vehicle 1 in the event of an abruptly and significantly changing GNSS reception situation. The order of steps a), b), c) and d) that is depicted by the blocks 110, 120, 130 and 140 is illustrative and can be taken for example at least once in the depicted order for the purpose of carrying out the method.

In block 110, step a) involves ascertaining the current ego position of the vehicle 1 by means of the GNSS-based location device 2. In block 120, step b) involves ascertaining at least one piece of integrity information relating to the ego position ascertained in step a), by means of the GNSS-based location device 2. In block 130, step c) involves detecting an abruptly and significantly changing or significantly altered GNSS reception situation. In block 140, step d) involves adapting the ascertainment of the at least one piece of integrity information for the changing or altered GNSS reception situation.

The adapting in step d) can be effected such that changes to the integrity information that occur as a result of the abruptly and significantly changing or significantly altered GNSS reception situation are damped and/or at least in some cases corrected.

The adapting in step d) can be effected such that during abruptly and significantly diminishing GNSS reception the integrity information is scaled using a scaling factor and/or has an ascertained first supplement value applied to it. In this regard, the scaling using the and/or the applying of the ascertained first supplement value can be carried out for a predefinable first length of time.

By way of example, upon or immediately after entering a dead reckoning area it is possible for a (current) protection level (PL), which is used by way of illustration as integrity information, to be calculated for the first length of time according to the following formula:

$$PL(t) = s \cdot \text{sigma} + b$$

Here, t is the (current) time, s is the first scaling factor, b is the first supplement value and sigma is the (current) standard deviation (or root of the variance) of the estimation of the ego position.

The first length of time can be determined experimentally. By way of illustration, 10 seconds can be used here. The first scaling factor can likewise be ascertained experimentally. Sigma is the estimated (current) standard deviation from for example a location filter of the location device.

The first supplement value can be used to compensate for a systematic error (bias) and can be ascertained as follows:

$$PL\_last - PL\_DR$$

if PL_last−PL_DR>0, otherwise 0 (zero)

Here, PL_last is the last protection level value before the dead reckoning area is entered and PL_DR is the first protection level value after the dead reckoning area is entered.

The start and end of a dead reckoning area, or of a dead reckoning mode, can be detected by (superordinate) systems of the vehicle and/or the location device, for example, in particular by detecting that the location method is switched over and/or GNSS reception significantly decreases or increases.

Additionally, there can be provision for the adapting in step d) to be effected such that during significantly diminished GNSS reception the integrity information has an ascertained second supplement value applied to it.

By way of example, after entering a dead reckoning area and after the first length of time has elapsed it is possible for a protection level (PL), which is used by way of illustration as integrity information, to be calculated according to the following formula:

$$PL(t) = \text{sigma} + \text{delta}$$

Here, delta is the second supplement value and can be ascertained as follows:

$$\text{delta} = PL\_DR, a - \text{sigma}(a)$$

Here, PL_DR,a is the protection level value when the first length of time elapses and sigma (a) is the standard deviation of the estimation of the position when the first length of time elapses.

Additionally, there can be provision for the adapting in step d) to be effected such that during abruptly and significantly intensifying GNSS reception the integrity information has an ascertained third supplement value applied to it. In this regard, the applying of the ascertained third supplement value can be carried out for a predefinable third length of time.

By way of example, upon or immediately after exiting a dead reckoning area it is possible for a (current) protection level (PL), which is used by way of illustration as integrity information, to be calculated for the third length of time according to the following formula:

$$PL(t) = \text{sigma} + D$$

Here, D is the third supplement value and can be ascertained as follows:

$$D = PL\_DR, \text{last} - \text{sigma}(t\_lastDR)$$

Here, PL_DR,last is the last protection level value in the dead reckoning area and t_lastDR is the last time in the dead reckoning area, and so sigma (t_lastDR) is the last standard deviation in the dead reckoning area.

Figure 2:
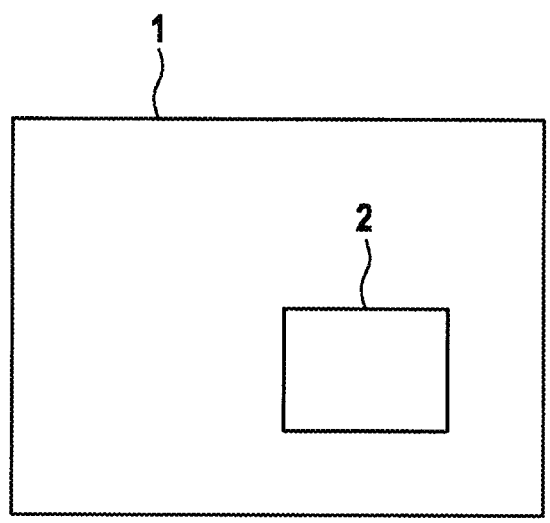
FIG. 2: schematically shows an illustrative location device, which is described here, in a vehicle.

FIG. 2 schematically shows an illustrative location device 2, which is described here, in a vehicle 1. The location device 2 is designed to carry out the method described here. The location device 2 here is a GNSS-INS location device by way of illustration.

For location using a GNSS-INS location device, it is frequently the case that the number of available GNSS signals is reduced or lost on account of obstacles in the surroundings or travel in a tunnel. This situation is usually referred to as dead reckoning (DR) mode. It is therefore advantageous when calculating the integrity information, for example the protection level (PL), to have a hybrid approach in order to achieve a correct PL transition upon entering the DR mode, to obtain a reliable PL during the DR mode and to achieve a correct transition upon leaving the DR mode.

The proposed method can advantageously contribute to an applicable hybrid approach in order to maintain the integrity of a GNSS/INS-based location sensor even in the DR module and/or if sudden changes in the GNSS reception from the normal state occur. In particular, the method can advantageously contribute to a protection level not experiencing pointless and sudden changes even in the event of a sudden change between the DR state and the normal state.

The invention claimed is:

1. A method for adapting an ascertainment of a protection level of a GNSS-based location device of a vehicle, the method comprising:
    a) ascertaining a current ego position of the vehicle using the GNSS-based location device;
    b) ascertaining the protection level relating to the ascertained ego position using the GNSS-based location device;
    c) detecting a GNSS reception situation that is abruptly and significantly changing; and
    d) adapting the ascertainment of the protection level based on the detection of the GNSS reception situation,
    wherein the abrupt change is a change that takes place over a period of sixty seconds or less, and
    wherein the significant change is a change in the GNSS reception situation by at least 50%.

2. The method according to claim 1, the d) adapting further comprising:
    adapting the ascertainment of the protection level, such that changes to the protection level that occur as a result of the detected GNSS reception situation are damped for a duration of the GNSS reception situation.

3. The method according to claim 1, the d) adapting further comprising:
    adapting the ascertainment of the protection level such that, during the GNSS reception situation, at least one of (i) the protection level is scaled using a scaling factor and (ii) an ascertained first supplement value is applied to the protection level.

4. The method according to claim 3, wherein at least one of (i) the scaling using the scaling factor and (ii) the applying of the ascertained first supplement value is carried out for a predefined first length of time corresponding to a duration of the GNSS reception situation.

5. The method according to claim 1, wherein:
    the GNSS reception situation is a significantly diminished GNSS reception situation,
    the d) adapting further comprises adapting the ascertainment of the protection level such that, during the significantly diminished GNSS reception situation, an ascertained second supplement value is applied to the protection level, and
    the significantly diminished GNSS reception situation is diminished by at least 50%.

6. The method according to claim 1, wherein:
    the GNSS reception situation is an abruptly and significantly intensifying GNSS reception situation,
    the d) adapting further comprises adapting the ascertainment of the protection level such that, during the abruptly and significantly intensifying GNSS reception situation, an ascertained third supplement value is applied to the protection level,
    the abrupt intensifying takes place over a period of sixty seconds or less, and
    the significantly intensified GNSS reception situation is intensified by at least 50%.

7. The method according to claim 6, wherein the applying of the ascertained third supplement value is carried out for a predefined third length of time corresponding to a duration of the abruptly and significantly intensifying GNSS reception situation.

8. The method according to claim 1, wherein the method is carried out by executing a computer program.

9. The method according to claim 1, wherein detecting the GNSS reception situation corresponds to the vehicle entering an area in which the GNSS-based location device uses an inertial location method and GNSS-based location is not possible.

10. A non-transitory machine-readable storage medium that stores a computer program for adapting an ascertainment of a protection level of a GNSS-based location device of a vehicle, the computer program being configured to, when executed:
    a) ascertain a current ego position of the vehicle using the GNSS-based location device;

b) ascertain the protection level relating to the ascertained ego position, using the GNSS-based location device;
c) detect a GNSS reception situation that is abruptly and significantly changing; and
d) adapt the ascertainment of the protection level based on the detected GNSS reception situation,
wherein the abrupt change is a change that takes place over a period of sixty seconds or less, and
wherein the significant change is a change in the GNSS reception situation by at least 50%.

11. A GNSS-based location device for a vehicle for adapting an ascertainment of a protection level, the GNSS-based location device being configured to:
a) ascertain a current ego position of the vehicle;
b) ascertain the protection level relating to the ascertained ego position;
c) detect a GNSS reception situation that is abruptly and significantly changing; and
d) adapt the ascertainment of the protection level based on the detection of the GNSS reception situation,
wherein the abrupt change is a change that takes place over a period of sixty seconds or less, and
wherein the significant change is a change in the GNSS reception situation by at least 50%.

\* \* \* \* \*